VEHICLE GUIDANCE SYSTEM AND ELECTRON IMAGE MATCHER

Filed Oct. 6, 1961 4 Sheets-Sheet 1

INVENTOR.
DONALD B. COHEN

BY [signature]

ATTORNEY

VEHICLE GUIDANCE SYSTEM AND ELECTRON IMAGE MATCHER

Filed Oct. 6, 1961 4 Sheets-Sheet 2

INVENTOR.
DONALD B. COHEN
BY
[signature]
ATTORNEY

*INVENTOR.*
DONALD B. COHEN
*BY*
A H Oldham
ATTORNEY

July 13, 1965 D. B. COHEN 3,194,511
VEHICLE GUIDANCE SYSTEM AND ELECTRON IMAGE MATCHER
Filed Oct. 6, 1961 4 Sheets-Sheet 4

INVENTOR.
DONALD B. COHEN
BY
[signature]
ATTORNEY

United States Patent Office 3,194,511

Patented July 13, 1965

3,194,511

VEHICLE GUIDANCE SYSTEM AND ELECTRON IMAGE MATCHER

Donald B. Cohen, Akron, Ohio, assignor to Goodyear Aerospace Corporation, a corporation of Delaware Filed Oct. 6, 1961, Ser. No. 144,010
3 Claims. (Cl. 244—14)

This invention relates to vehicle guidance systems, and, more particularly, is concerned with an electron image matcher employed in such a system.

It is the general object of the invention to provide a simplified, improved, relatively inexpensive vehicle guidance system characterized by a minimum of parts, lightness of weight, and relatively small space requirements, but having high operating efficiency and speed.

Another object of the invention is the provision of an electron image matcher for use in vehicle guidance systems, and the like, and whereby an optical image of a subject can be matched with a picture of the subject by converting the optical image to an electron image, providing the complete electron image with substantially circular nutation and converting the nutating electron image back to a nutating optical image which is superimposed upon the picture, together with means for indiacting match or substantial match between the image and picture, and the position of this match in terms of error voltage.

The foregoing objects of the invention, and other objects which will become apparent as the description proceeds, are achieved by the combination in an electron image matcher of means for producing an optical image, means for converting the optical image to an electron image, means for converting the electron image back to an optical image, means for focusing the electron image on the last-named converting means, electrical means for providing the complete focused electron image with substantially circular nutation on the last-named converting means, a transparent picture to the same scale and orientation as the image but of opposite contrast, lens means for superimposing the nutating optical image on the picture, and light responsive means for indicating substantially a match between the image and picture when a given amount of light from the image passes through the picture.

The guidance system of the invention comprises the combination of a vehicle having a self-contained guidance system including means for producing an optical image of a given subject, means for converting the optical image to an electron image, means for converting the electron image back to an optical image, means for focusing the electron image on the last-named converting means, electrical means for providing the complete focused electron image with substantially circular nutation on the last-named converting means, a film-like picture of the subject but of opposite contrast to the image, means for superimposing the nutating optical image on the picture and to substantially the same scale and orientation, light responsive means for indicating substantially a match between the image and picture when a given amount of light from the image passes through the picture, discriminating means connected to the nutating means and the light responsive means for producing right-left and up-down error voltages, and means operated by the error voltages for returning the vehicle to a selected course.

For a better understanding of the invention, reference should be had to the accompanying drawings, wherein FIG. 1 is a schematic illustration, partially in perspective, of one embodiment of the apparatus of the invention;

Figure 1:
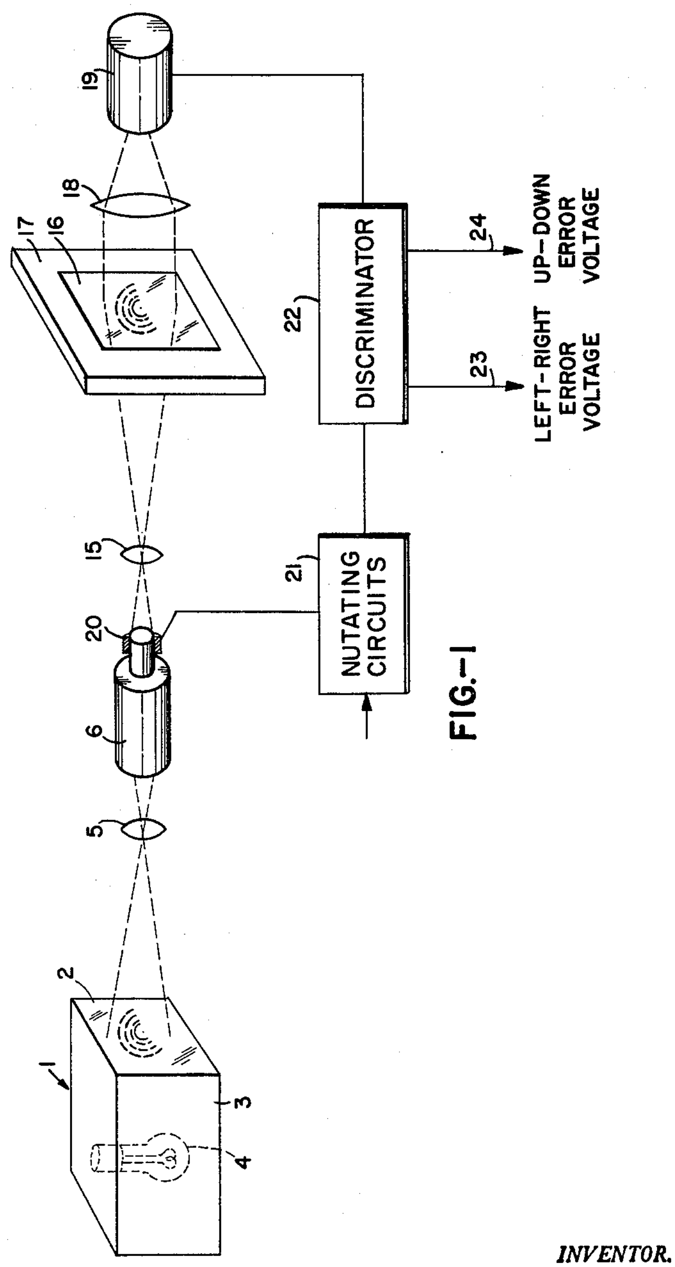

Having more particular reference to the drawings, FIG. 1 illustartes as a whole by the numeral 1 a means for providing an optical image of a given subject. The subject in the particular form shown is a radar map 2 made on a film by a photographic process to produce a transparency having certain portions relatively black and opaque, other portions substantially transparent, and with still other portions sometimes a shade of grey and translucent. The term "film-like" or "transparent" as employed throughout the specification and claims is intended to define a combined transparency, translucency, and opaque object such as the image 2.

The image 2 is mounted at the end of a closed box 3, and positioned inside of the box is a light 4 which shines through the transparent and translucent portions of the image 2 and is focused by lens 5 onto the end of a converting tube indicated as a whole by the numeral 6.

Figure 4:
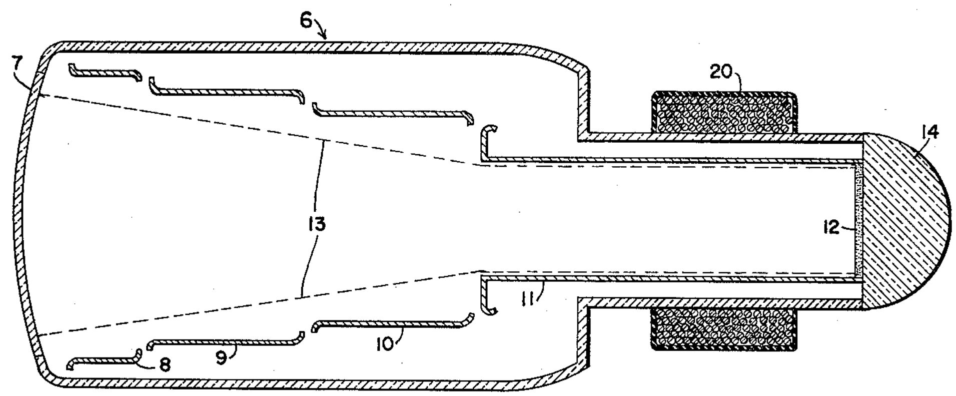
FIG. 4 is an enlarged longitudinal sectional view of the converting means utilized in the invention.

The converting tube 6 is of the 1P25A type made and sold by the Farnsworth Company, and is more particularly illustrated in longitudinal section in FIG. 4 as including a photocathode 7 upon the outer surface of which the optical image 2 is focused by the lens 5. The photocathode 7 generates a series of electrons on its inner surface which are focused by a series of plates 8, 9, 10 and 11 upon an output phosphor 12 at the other end of the tube 6. In a typical installation 15 volts is applied to plate 8, 100 volts to plate 9, 600 volts to plate 10, and 4,000 volts to plate 11. Lines 13 indicates the manner in which the electrons are focused as they pass from the photocathode 7 to the output phosphor 12.

Thus, the tube 6 serves to convert the optical image 2 applied on the outer surface of the photocathode 7 to an electron image which as it is applied to the phosphor 12 is converted back to an optical image, with a lens 14 facilitating the reading out of the optical image from the tube. The optical image read out from the tube is normally much brighter than the optical image put into the tube, and this is normally the function of a 1P25A tube.

Returning now to FIG. 1, the optical image read out of the tube 6 is focused by a lens 15 upon a picture 16 carried in a frame 17. The picture 16 is of the same subject as the image 2, is of the same film-like transparent character, but is normally of opposite contrast to the image 2, so that those portions of the image 2 which are transparent are opaque in the picture 16, and those portions of the image 2 which are opaque are transparent in the picture 16, as will be understood.

The image 2 as it is superimposed upon the picture 16 is to substantially the same scale and orientation as the picture 16 whereby a matching of the superimposed image and picture is possible.

It should be noted here that when the image 2 and the picture 16 are made of opposite contrast that when a match between these is effected, in a manner hereinafter described, that the light passing through the picture is at a minimum. In fact, if a perfect match is effected the output of light will drop substantially to zero. The use of opposite contrast image and map in the manner described, is the preferred way of practicing the invention. On the other hand, it is possible to make the image 2 and the picture 16 of the same contrast and to measure for a maximum amount of light flow through the picture 16 from the image 2 when a match is achieved.

In any event, the light passing through the picture 16 from the image 2 strikes a lens 18 which condenses the light upon a light responsive means, such as a photocell 19, which produces a voltage proportional to the amount of light passing through the picture 16 to thereby give a voltage indication, either of minimum or maximum, and in a given amount, at the time that a match is effected.

Now returning to FIG. 4, the manner of achieving a match between the image 2 and the picture 16 is a substantially circular nutating, circuitous, or scanning movement effected in the tube 6 by electrical means. These means comprise a deflection yoke or coil 20 which surrounds the reduced neck portion of the tube 6 in substantially the position shown in FIG. 4, and an alternating current voltage passed to the deflection yoke 20 causes the nutating, circuitous, or scanning movement, usually circular, of the focused electrons in the path 13 whereby the entire electron image is simultaneously moved upon the phosphor screen 12. Thus, there is effected a nutating, circuitous, or scanning movement of the optical image produced upon the phosphor screen 12. In this manner the optical image produced upon this screen when transmitted by the lens 15 against the picture 16 causes the optical image to nutate or scan in relation to the picture 16 to thereby seek a match between the image and the picture.

FIG. 1 indicates a box 21 having suitable electric circuits connected to the deflection yoke 20 for effecting the nutating movements of the complete electronic image in the tube 6, and the nutating circuits of box 21 are likewise connected to a discriminator 22 in turn connected to the photo-cell 19 so that when a match is signalled by the photocell 19, the position or phase of the nutating circuit is likewise indicated to signal the direction of mismatch in any given rotary quadrant of the deflection yoke. The quadrant in which the match is effected breaks down into a left-right error voltage and an up-down error voltage output from the discriminator 22, these signals being indicated by the numerals 23 and 24 respectively.

The nutating circuits of box 21 are well within the ability of the man skilled in the art to provide. It may be noted, however, that a typical circuit suitable for this purpose is shown and described in pages 257 and 467 of the textbook Electron Tube Circuits by Samuel Seely, PhD. published in 1950 by McGraw Hill Book Co., Inc.

In similar fashion, the circuits of discriminator 22 can be readily provided by the skilled electronics engineer. Typical circuits for this purpose being shown and described in page 521 of the textbook Waveforms (Vol. 19 M.I.T. Radiation Lab. Series) by Louis Ridenour, published in 1949, by McGraw Hill Book Co., Inc.

Figure 5:
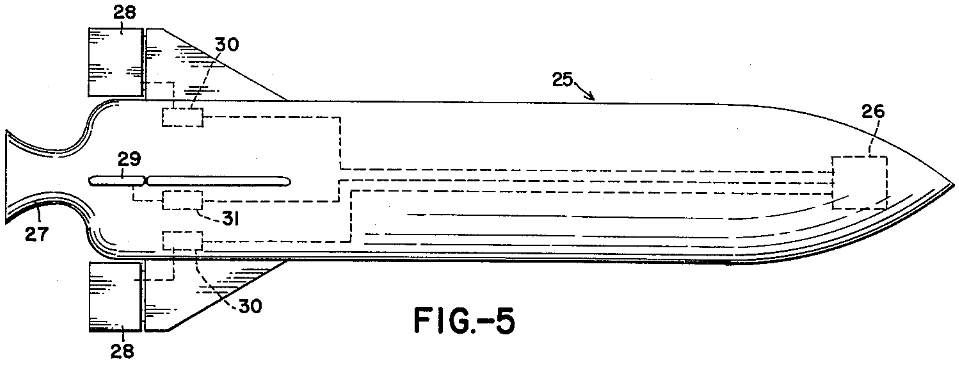
FIG. 5 is a side elevation of a vehicle incorporating the guidance system of the invention.

The right-left error voltage 23, and the up-down error voltage 24 may be used to control the guidance of a vehicle, thus in FIG. 5 a vehicle in the form of a missile 25 is provided with control mechanism 26 of the general type shown in FIG. 1, or more particularly, of the type shown in FIGS. 2 and 3, and hereinafter described. The missile 25 may be powered in known manner and include a discharge nozzle 27, right-left control vanes 28, and up-down control vanes 29. The guidance mechanism 26 then provides the error voltages specified in conjunction with the apparatus of FIG. 1, these error voltages, usually with amplification, operating servo-motors 30 controlling vanes 28 and servo-motors 31 controlling vanes 29.

Figure 2:
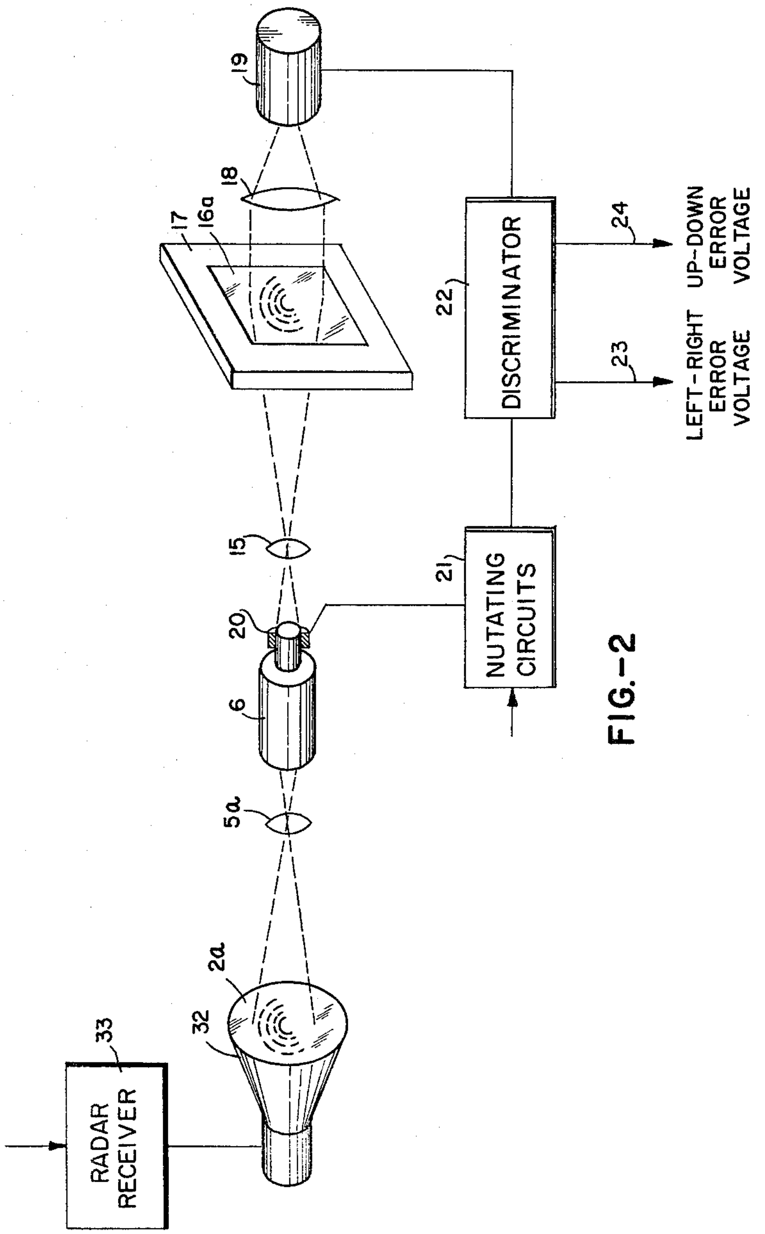
FIG. 2 is a view similar to FIG. 1, but illustrating another manner of providing an optical image in the system of the invention.

Now referring to FIG. 2, in adapting the apparatus of FIG. 1 to the control of a vehicle, such as the missile 25, the box 1 of FIG. 1 is replaced with a visual readout storage tube 32, producing a radar image 2*a*, the storage tube 32 being connected to a radar receiver 33. It will be understood that in this form of the invention a radar transmitter of a suitable type, and including the radar receiver 33 and visual readou storage tube 32 becomes part of the control mechanism 26 associated with the missile 25. The radar scanning or viewing an area or subject, such as terrain, the moon, or the like produces a radar image 2 thereof. This image 2*a* is then compared with the previously prepared radar picture 16*a* by the apparatus of FIG. 2. The remainder of the apparatus of FIG. 2 is identical to the apparatus of FIG. 1, and will not be described in detail, except to note that the apparatus of FIG. 2 has had the suffix "*a*" added to the numerals indicating the various portions thereof.

Figure 3:
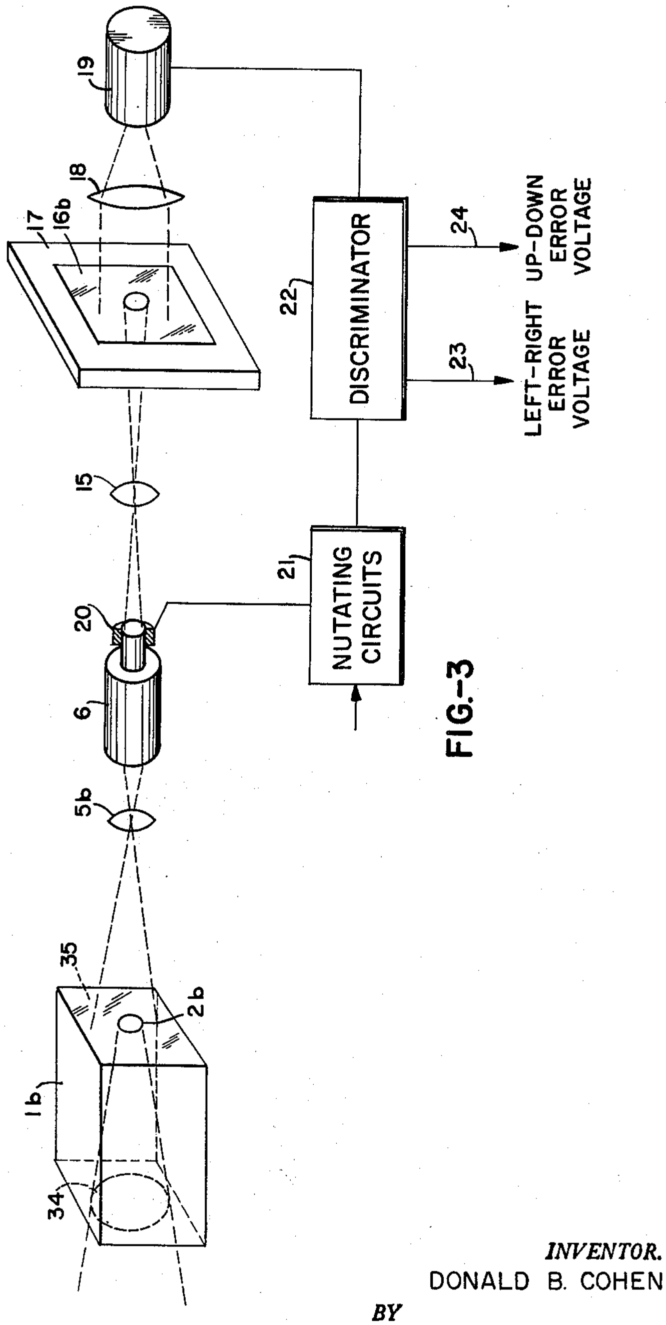
FIG. 3 is a view similar to FIGS. 1 and 2, but illustrating still another manner of providing an optical image for the apparatus of the invention.

Because of the difficulty in certain vehicles, such as a missile, to carry a complete radar transmitter and receiver, the apparatus of FIG. 3 has been provided. In this apparatus the box 1 of FIG. 1 has been replaced with a box 1*b* having a lens system 34 at one end thereof for optically focusing a given terrain, the sun, or a group of stars, upon a frosted glass screen 35 at the other end of the box 1*b*. If, for example, the box 1*b* is looking at the sun, an image 2*b* thereof will be provided upon the glass 35 in the manner shown in FIG. 3. The remainder of the apparatus of FIG. 3 is like the apparatus of FIG. 1, and like parts have been indicated by the same numerals as in FIG. 1, except that the suffix "*b*" has been added to the parts in FIG. 3.

It will be recognized that the apparatus of FIG. 3 best adapts itself to the control mechanism 26 of a vehicle, such as the missile 25, with the optical apparatus of FIG. 3 being directed toward a selected subject or object which will then be matched to a previously prepared picture 16*b* of the same object with error voltages being generated should the vehicle get off course, these error voltages bringing the vehicle back on course in the manner previously described. In a guidance system of the type described, it is the usual practice to initially place the vehicle upon the desired course, or substantially thereon, by means of more conventional guidance systems, such as an automatic pilot, with the control apparatus of the present invention taking up the guidance of the vehicle after it has been brought substantially to course by the automatic pilot.

The guidance apparatus of FIG. 2 is better adapted to a larger vehicle, such as a ship, although it can be incorporated into missile guidance, as will be understood.

While a certain representative embodiment and details have been shown for the purpose of illustrating the invention, it will be apparent to those skilled in this art that various changes and modifications may be made therein without departing from the spirit or scope of the invention.

What is claimed is:

1. The combination of a vehicle having a self-contained guidance system including means for producing an optical image of a map, said means including an optical system to focus the image on a frosted glass screen, means for converting the optical image to an electron image, means for increasing the brightness and for converting the electron image back to an optical image having increased brightness, means for focusing the electron image on the last-named converting means, a deflection yoke on the first named converting means, nutating circuitry connected to said deflection yoke for nutating the complete focused electron image on the last-named converting means, a film-like picture of the map but of opposite contrast to the image, means for superimposing the complete optical image as it is nutated on the picture and to substantially the same scale and orientation, light responsive means for indicating substantially a match between the image and picture when a given amount of light from the image passes through the picture, discriminating means connected to the nutating circuitry and the light responsive means for producing right-left and up-down error voltages, and means operated by the error voltages for returning the vehicle to a selected course.

2. The combination of a vehicle having a self-contained guidance system including means for producing an optical image of a given area of the earth's terrain, means for converting the optical image to an electron image, means for increasing the brightness and for converting the electron image back to an optical image, means for focusing the electron image on the last-named converting means, electrical means for nutating the complete focused electron image on the last-named converting means, a film-like picture of substantially the same area of the earth's terrain, means for superimposing the complete optical image as it is on the picture and to substantially the same scale and orientation, means for indicating substantially a match between the image and picture when a given amount of light from the image passes through the picture, discriminating means connected to the nutating means and the match indicating means for producing right-left and up-down error voltages, and means operated by the error voltages for returning the vehicle to a selected course.

3. The combination in an electronic image matcher of means for producing an optical image of a map, means for converting the optical image to an electron image, means for converting the electron image back to an optical image having increased brightness, means in the converting means for focusing the electron image, electrical means for nutating the complete focused electron image on the last-named converting means, a transparent picture to the same scale and orientation as the image but of opposite contrast, lens means for superimposing the complete optical image as it is nutated on the picture, light responsive means for indicating substantially a match between the image and picture when a given amount of light from the image passes through the picture, and means to determine at what angular relation in the nutation of the electron image that said substantial matching takes place between the image and the picture.

References Cited by the Examiner

UNITED STATES PATENTS

| | | | |
|---|---|---|---|
| 2,506,018 | 5/50 | Flory | 313—65 |
| 2,808,768 | 10/57 | Squassoni | 313—65 |
| 2,869,024 | 1/59 | Bruining | 313—65 X |
| 2,884,540 | 4/59 | Shockley | 244—14 X |
| 2,929,866 | 3/60 | Melamed | 313—65 X |
| 3,098,933 | 7/63 | Barasch | 244—14 |

FOREIGN PATENTS

| | | |
|---|---|---|
| 814,124 | 5/59 | Great Britain. |

OTHER REFERENCES

Guided Missiles Fundamentals, AF Manual 52–31, September 20, 1957, pages 444–446.

BENJAMIN A. BORCHELT, *Primary Examiner.*

CHESTER L. JUSTUS, SAMUEL FEINBERG, *Examiners.*